Feb. 12, 1935.  E. J. LIDDLE  1,990,703
ENGINE
Filed June 2, 1933
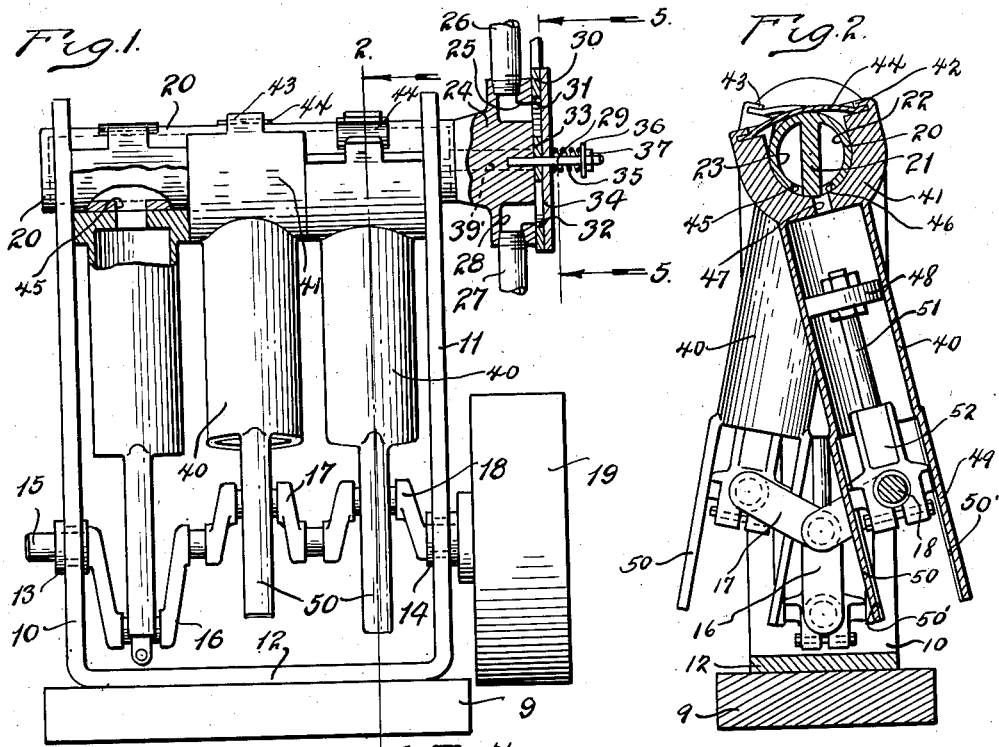
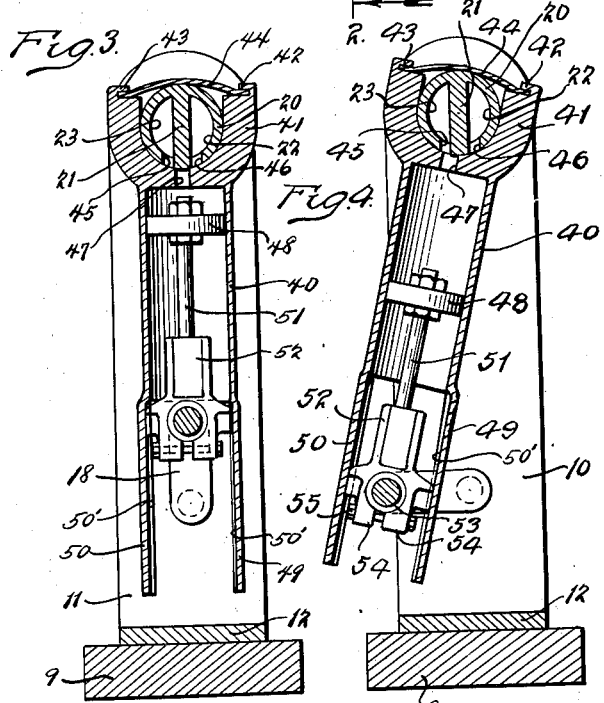
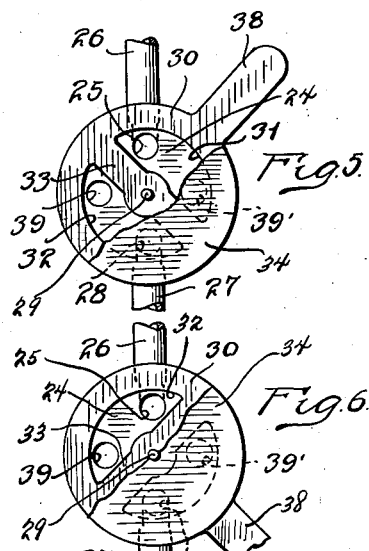
INVENTOR.
Ewart J. Liddle
BY
Thos. F. Donnelly
ATTORNEY.

Patented Feb. 12, 1935

1,990,703

UNITED STATES PATENT OFFICE 1,990,703

ENGINE

Ewart J. Liddle, Wyandotte, Mich.

Application June 2, 1933, Serial No. 673,963

1 Claim. (Cl. 121—65)

My invention relates to a new and useful improvement in a fluid operated engine adapted for being operated either by steam, compressed air, or similar fluid under pressure.

It is an object of the present invention to provide a device of this class which will be simple in structure, economical of manufacture, durable, compact, possessed of a maximum efficiency, easily and quickly assembled, and possessed of a minimum number of parts to assure a continued operation.

Another object of the invention is the provision of an engine of this class having a plurality of swingably mounted cylinders and provided with a control means whereby the engine may be operated in either direction.

Another object of the invention is the provision in an engine of this class of a stationary conduit which serves as a support for rockably mounted cylinders, and also as a conductor for conducting fluid under pressure to the cylinders.

Other objects will appear hereinafter.

The invention consists in the combination and arrangement of parts hereinafter described and claimed.

The invention will be best understood by a reference to the accompanying drawing which forms a part of this specification, and in which Fig. 1 is a side elevational view of the invention with parts broken away and parts shown in section.

Fig. 2 is a sectional view taken on line 2—2 of Fig. 1 showing the cylinders in a certain position.

Fig. 3 is a sectional view similar to Fig. 2 showing the cylinders in another position.

Fig. 4 is a view similar to Fig. 3 showing the cylinders in still another position.

Fig. 5 is a view taken on line 5—5 of Fig. 1.

Fig. 6 is a view similar to Fig. 5 showing the control disc moved to another controlling position.

I have illustrated the invention mounted on a base 9, projecting upwardly from which is a U-shaped support consisting of the vertically extended legs 10 and 11 and the bight 12. These legs 10 and 11 serve as standards for supporting the structure. In the leg 10 is mounted a bearing 13 in alignment with a bearing 14 mounted in the leg 11. A shaft 15 is journaled rotatably in these bearings, and this shaft is provided with the cranks 16, 17, and 18, positioned between the standards 10 and 11 and with the flywheel 19 exterior of the standards.

A tubular member 20 is supported on the standards 10 and 11 adjacent their upper ends. A central partition 21 extends longitudinally of the member 20 to divide it into a pair of chambers 22 and 23.

A head 24 is mounted on one end of the member 20. This head is provided with a passage 25 which opens outwardly at the outer face of the head 24 and with which communicates a pipe or conduit 26 which may serve either as an intake pipe to deliver fluid under pressure, or as an exhaust pipe. A pipe 27 communicates with the passage 28 formed in the head 24, this passage opening outwardly at one face of the head. The pipe 27 may also serve either as an intake pipe or an exhaust pipe.

Projecting centrally outwardly from the outer face of the head 24 is a stud 29. A valve disc 30 is adapted for engaging the outer surface of the head 24. This disc is cut away as at 31 and 32 to provide the diametrically extended rib 33 through which the stud 29 projects. A sealing disc 34 is mounted in engagement with the outer surface of the valve disc 30 and held in sealing engagement with the outer surface by means of a spring 35 which embraces the stud 29 which also projects through the disc 34. The sealing disk 34 is spaced from the outer face of the head 25 by the valve disk 30 and consequently there is formed a compartment at each of the cut away portions 31 and 32, so that in the view shown in Fig. 5, the pipe 26 is in communication with the pipe 39' through the passage 25 and the cut away portion 31; and the passage 39 is in communication with the pipe 27 through the passage 28 and the cut away portion 32. In Fig. 6, the passages 25 and 39 are in communication as are the passages 28 and 39'. The outer end of the spring 35 is engaged by a washer 36, which is held in position by means of the nut 37, threaded on the stud 29. The tension of the spring 35 can be adjusted by threading or unthreading of the nut 37. An operating handle 38 projects outwardly from the periphery of the valve disc 30. A pair of passages 39 and 39' are formed axially in the head 24, each of these passages communicating with one of the chambers 22 or 23.

When the valve disc 30 is moved to the position shown in Fig. 5, the pipe 26 will be in communication through the passage 39' with the chamber 22, and the pipe 27 will be in communication through the passage 39 with the chamber 23. When the valve disc 30 is moved to the position shown in Fig. 6 the pipe 26 will be in communication through the passage 39 with the chamber 23 and the pipe 27 will be in communication through the passage 39' with the chamber 22.

In the drawing I have shown a plurality of cylinders mounted in operative position on the device. Each of these cylinders is similarly constructed and similarly operated, so that a description of one will suffice for both. The cylinder 40 is provided with a yoke-shaped head 41 which is adapted to partially embrace the conduit 20. Inwardly projecting lugs 42 and 43 are formed on the upper ends of each of the yoke arms and adapted to overlie the opposite ends of a spring 44 which serves to mount the cylinder rockably on the conduit 20. Formed in the conduit at each of the cylinders is an outlet port 45 communicating with the chamber 23, and an outlet port 46 communicating with the chamber 22. A port 47 is formed in the cylinder head so that upon rocking of the cylinder relatively to the conduit 20, which is stationary, the port 47 may alternately be brought into registration with the ports 45 and 46 so as to alternately communicate with the chambers 23 and 22.

A piston 48 is slidably mounted in each of the cylinders 40. Each of these cylinders is provided at its lower end, at opposite sides, with guide extensions 49 and 50, each having the guide groove 50' formed on its inner surface, in which engages the opposite sides of the slide block 52 which is carried by the lower end of the pitman or connecting rod 51, which projects centrally outwardly from the piston 48. The slide block 52 is provided with a bearing 53 for one of the cranks on the crank shaft. This slide block is slit at its lower ends to provide the parts 54 which may be drawn together by means of the bolt 55 to securely clamp the device about the crank on which mounted. These cranks 16, 17, and 18 are offset relatively to each other so that where a plurality of cylinders is used, the stopping of the device on dead center is obviated.

In operation the valve disc 30 will be turned to either the position shown in Fig. 5 or the position shown in Fig. 6. When turned to the position shown in Fig. 5 and the fluid under pressure such as steam or compressed air is delivered through the pipe 26, the same will pass through the passage 39' into the chamber 22, and because at least one of the pistons will be located with its port 47 in registration with the port 46, a sliding movement of the piston in this cylinder will be effected to cause a rotation of the crank shaft 15. As this rotation sets up, the cylinder will rock on the member 20 as a support or axis. This will effect a rocking of the other cylinders, so that as the port 47 in one cylinder moves out of registration with the port 46, a port 47 in another cylinder will have registered with its port 46. When the crank shaft has been turned to such a position that the piston 48 is moved upwardly, the port 47 will have moved into registration with the port 45, thus permitting an exhaust of the cylinders through the chamber 23, the passage 39 and the pipe 27.

When the valve disc 30 is moved to the position shown in Fig. 6, the fluid under pressure delivered through the pipe 26 will pass through the passage 39 into the chamber 23, thus reversing the operation of the device. It is obvious that when the valve disc 30 is moved to position so that the diametrically extending rib 33 overlies the inlet port 25, the device will not be operated, as the intake of the fluid under pressure will thus be prevented.

With an engine constructed in this manner a very compact arrangement may be provided in an engine of this type, and a very quiet operation results, substantially free from vibrations. The spring 44, of course, maintains the yoke head 41 in close engagement with the member 20 as to cause the head 41 to serve as a valve for closing the ports 45 and 46, when the port 47 is moved out of registration with these ports.

While I have illustrated and described the preferred form of my invention, I do not wish to limit myself to the precise details of structure shown but desire to avail myself of such variations and modifications as may come within the scope of the appended claim.

Having thus described my invention, what I claim as new and desire to secure by Letters Patent is:

In an engine of the class described, a stationary cylindrical conduit; a plurality of cylinders; a yoke shaped head on each of said cylinders partially embracing said conduit, each of said yoke shaped heads having a groove formed in its upper end; and a resilient plate engaging in said grooves and extending across said conduit for securing said yoke shaped head rockably on said conduit.

EWART J. LIDDLE.